(12) United States Patent
Ogura

(10) Patent No.: US 6,249,612 B1
(45) Date of Patent: *Jun. 19, 2001

(54) DEVICE AND METHOD FOR IMAGE CODING

(75) Inventor: Eiji Ogura, Saitama (JP)

(73) Assignee: Sony Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/035,700

(22) Filed: Mar. 5, 1998

(30) Foreign Application Priority Data

Mar. 19, 1997 (JP) .................................................. 9-065867

(51) Int. Cl.$^7$ ............................... G06K 9/36; G06K 9/46
(52) U.S. Cl. .......................... 382/236; 382/107; 348/699; 348/407.1
(58) Field of Search .................................... 382/232, 239, 382/248, 250; 348/402, 403, 404, 407, 413, 416, 420, 431, 699

(56) References Cited

U.S. PATENT DOCUMENTS

| | | | |
|---|---|---|---|
| 5,594,813 | * 1/1997 | Fandrianto et al. | 382/236 |
| 5,894,526 | * 4/1999 | Watanabe et al. | 382/236 |
| 5,973,742 | * 10/1999 | Gardyne et al. | 348/416 |
| 5,982,439 | * 11/1999 | Parke | 348/699 |

FOREIGN PATENT DOCUMENTS 0 652 678 A2   5/1995   (EP)  .............................. H04N/7/36

OTHER PUBLICATIONS

Patent Abstracts of Japan, vol. 014, No. 037 (E–0980), Sep. 19, 1990 & JP 02 171093 A (Nec Corp.) Jul. 2, 1990.

* cited by examiner

Primary Examiner—Jon Chang
Assistant Examiner—Timothy M. Johnson
(74) Attorney, Agent, or Firm—Frommer Lawrence & Haug, LLP.; William S. Frommer; Joe H. Shallenburger

(57) ABSTRACT

The invention relates to a device and method for image coding. A reference frame memory for storing image data of a reference frame, a search memory for storing image data of a search frame, a motion detection means for reading image data from the reference frame memory and the search memory and calculating it to detect a motion vector, and a judgement means for generating a motion vector distribution from the motion vector detected by the motion detection means on a search range of the search frame M fields or M frame (M is an integer of one or larger) apart from the reference frame and deciding a search position between images N fields or N frames (N is an integer larger than M) part based on the motion vector distribution are provided, and the motion detection means performs motion detection at the search position decided by the judgement means. The search range can be thereby enlarged without increment of the search block transfer rate when an image is coded.

16 Claims, 17 Drawing Sheets d1, d2 : MOTION VECTOR
e1, e2 : RESIDUAL DIFFERENCE
f : FINAL MOTION VECTOR

FIG. 3
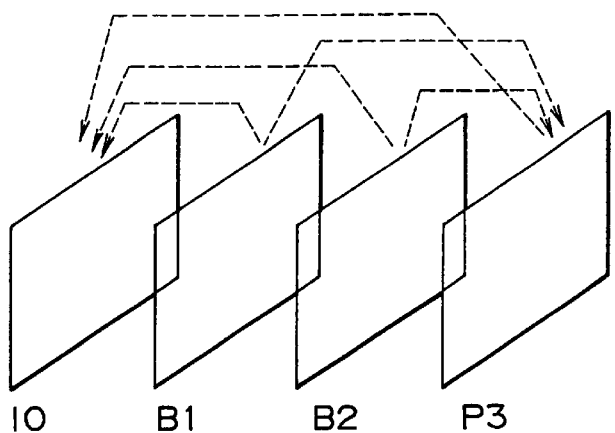
I0  B1  B2  P3
FIG. 4A  FIG. 4B  FIG. 4C
 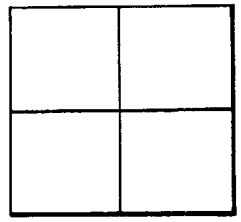 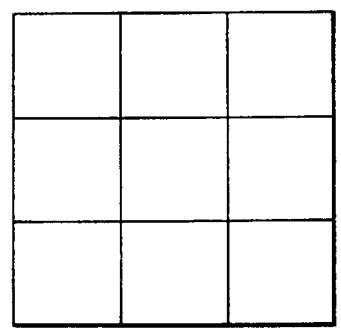
1 FRAME    2 FRAMES    3 FRAMES
H : ±16    H : ±32     H : ±48
V : ±16    V : ±32     V : ±48

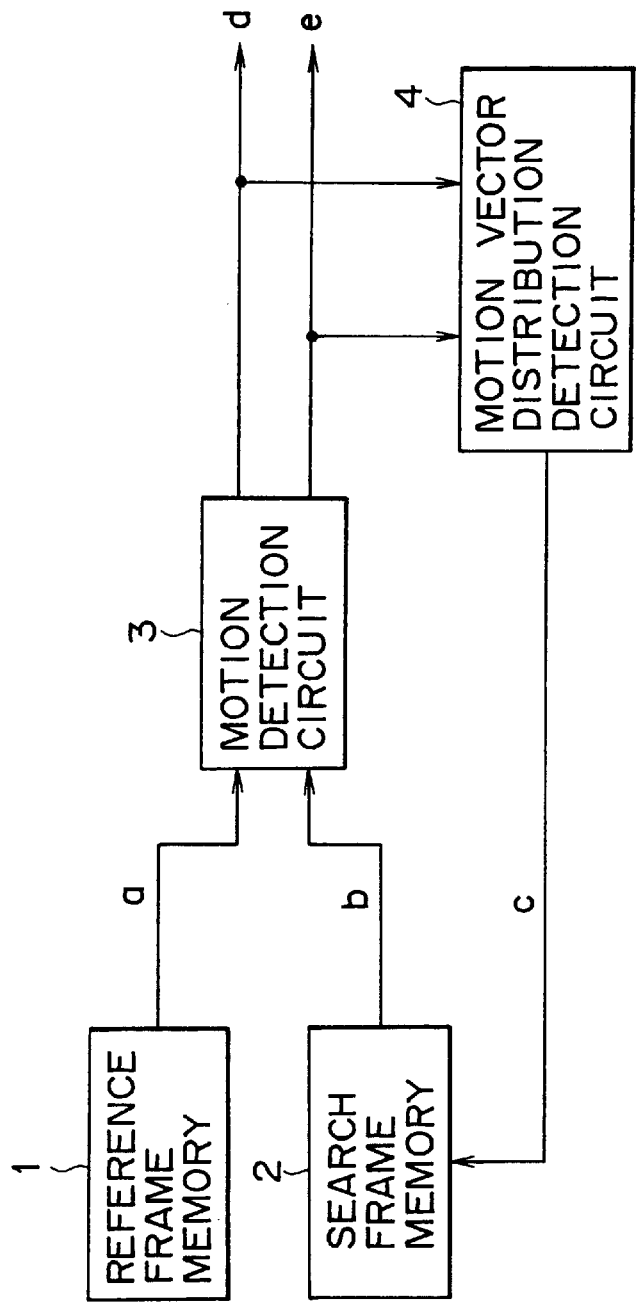

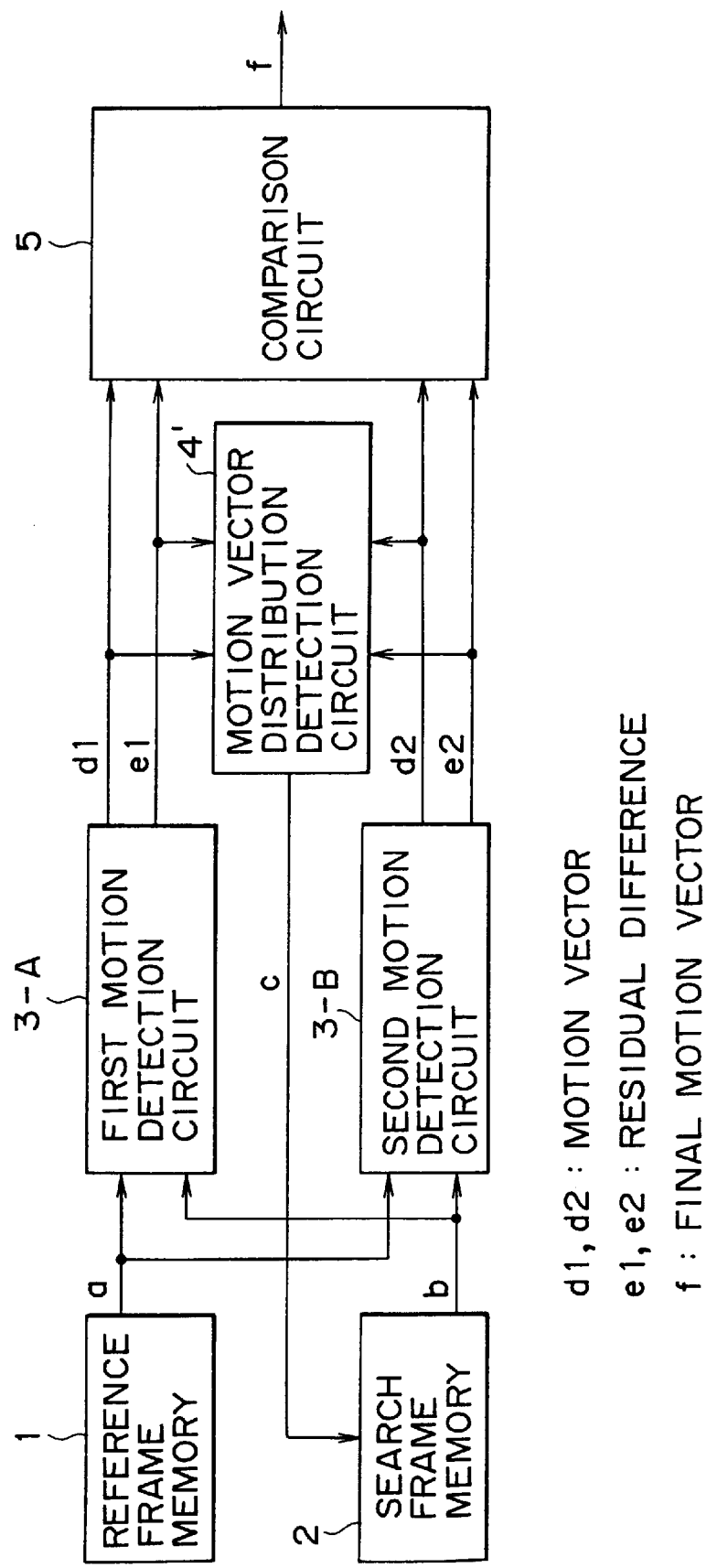

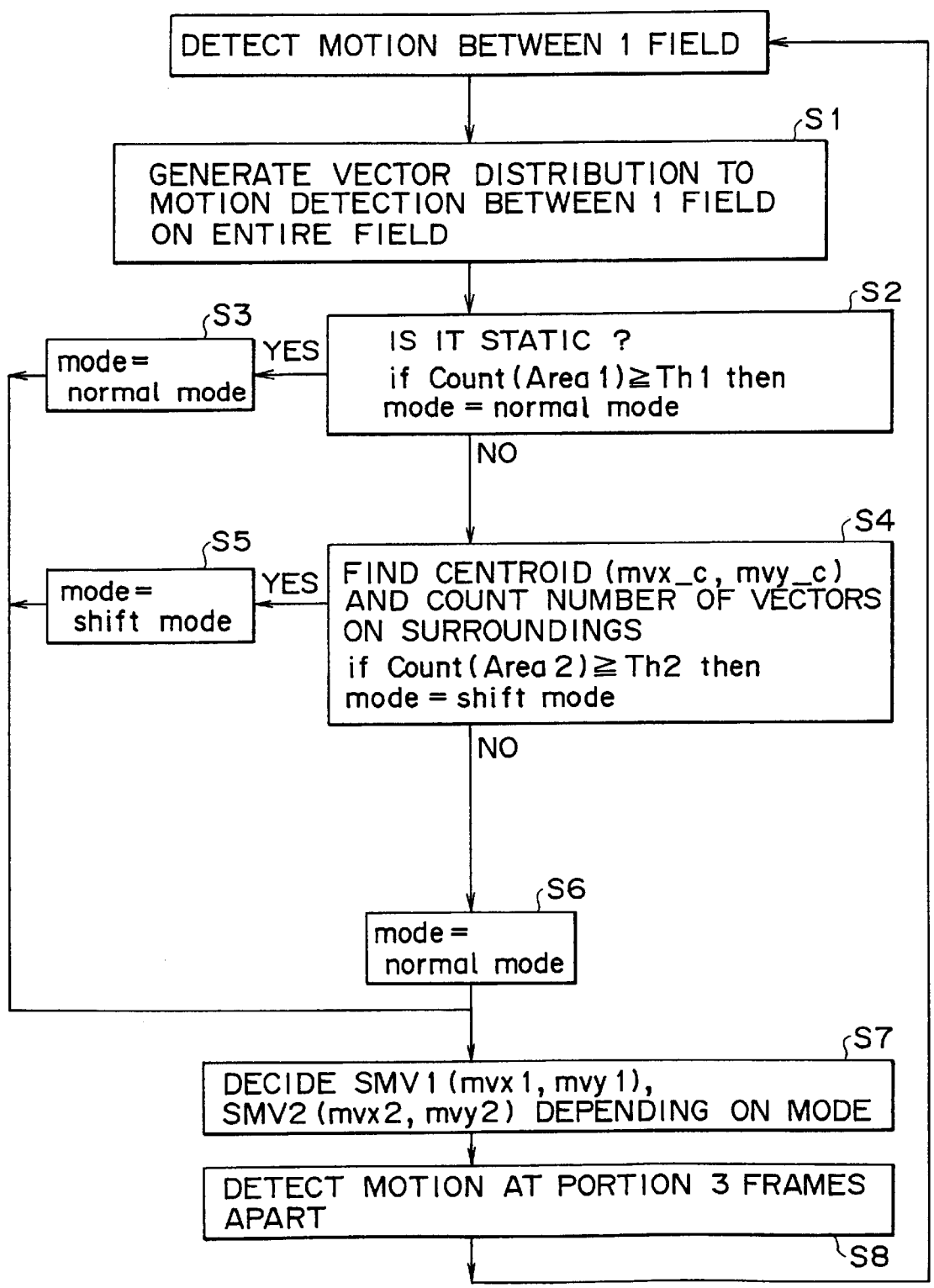

a REFERENCE FRAME SIGNAL
b1~b3 SEARCH FRAME SIGNAL
c1~c3 SEARCH DATA READ CONTROL SIGNAL

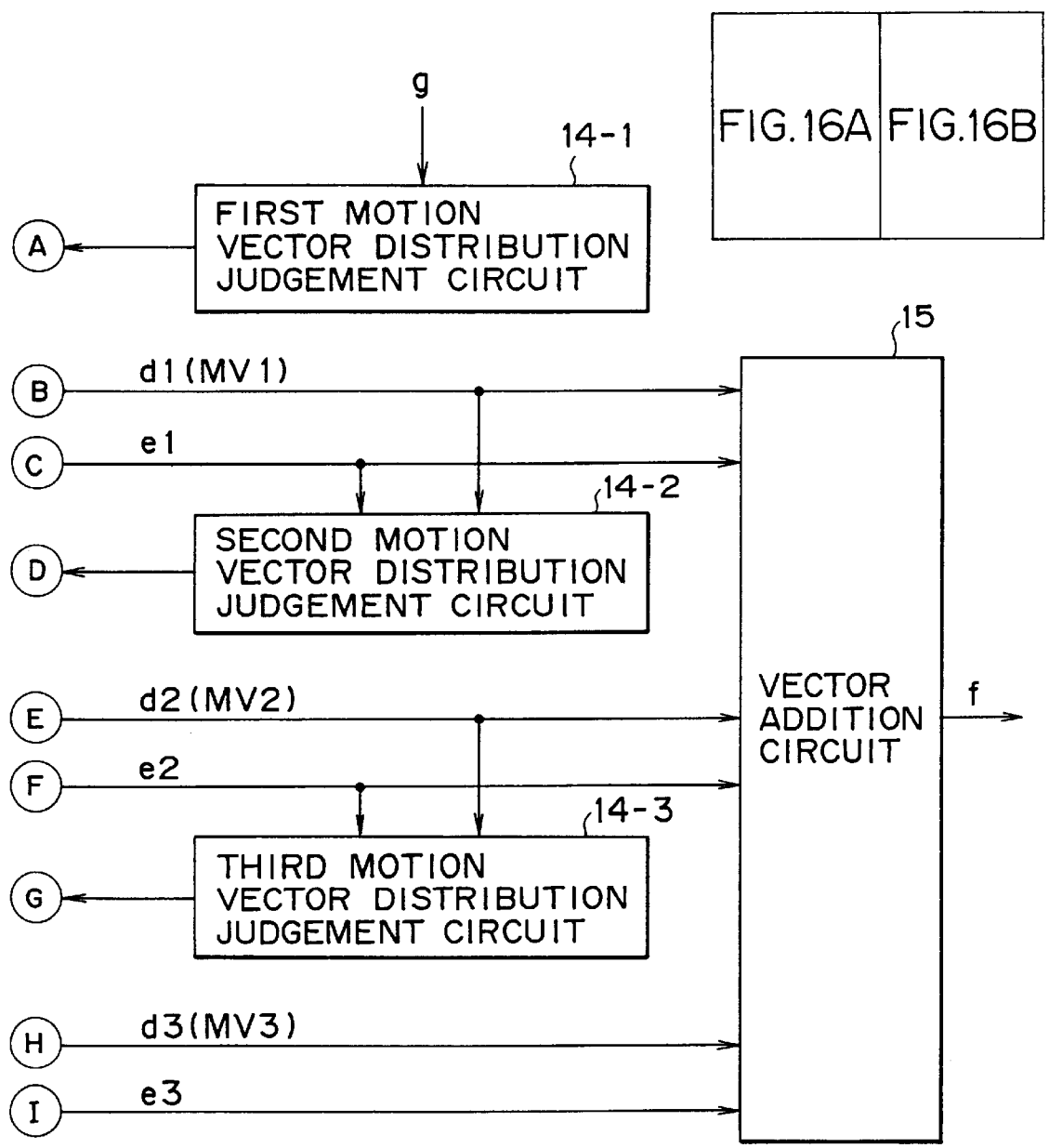

DEVICE AND METHOD FOR IMAGE CODING

BACKGROUND OF THE INVENTION

1. Field of the Invention

This invention relates to a image coding device based on, for example, MPEG (Moving Picture Image Coding Experts), and more particularly relates to a detection technique of motion vectors.

2. Description of Related Art

MPEG system was established by ISO/IEC JTC1/SC29 which is the abbreviation of International Organization for Standardization/International Electrotechnical Commission, Joint Technical Committee 1/Sub Committee 29 and an organization for discussing dynamic image coding.

MPEG system is a coding system for compressing an image data using combination of DCT (Discrete Cosine Transform), motion compensative prediction, and variable word length coding.

The structure of an image coding device based on MPEG system is shown in FIG. 1. In this drawing, the image data is supplied to the input terminal T1. The image data is inputted to a motion vector detection circuit 21 and subtraction circuit 22. The motion vector detection circuit 21 calculates a motion vector from the current frame and reference frame (for example, precedent frame) using the input image data, and supplies it to a motion compensation circuit 23.

The image data of the reference frame is stored also in a frame memory 24. The image data is supplies to the motion compensation circuit 23. The motion compensation circuit 23 performs motion compensation of the image data transmitted from the frame memory 24 using the motion vector supplied from the motion vector detection circuit 21. The output from the motion compensation circuit 23 is transmitted to the subtraction circuit 22 and addition circuit 25.

The subtraction circuit 22 determines the prediction error data by calculating the difference between the image data of the current frame supplied from the input terminal T1 and the motion-compensated image data of the reference frame supplied from the motion compensation circuit 23, and supplies it to a DCT circuit 26. The DCT circuit 26 performs DCT processing on the error prediction data and transmits it to a quantizer 27. The quantizer 27 quantizes the output from the DCT circuit 26, and transmits it to a variable work length coding circuit (not shown in the drawing).

The output from the quantizer 27 is supplied also to a reverse quantizer 29. The output is subjected to reverse quantizing processing, and the output is subjected to reverse DCT processing in a reverse DCT circuit 30 and is returned to the original prediction error data, and supplied to the addition circuit 25.

The addition circuit 25 adds the prediction error data to the output data from the motion compensation circuit 23 to calculate both data of the current frame. The calculated image data is stored in the frame memory 24 as an image data of the next reference frame.

The block matching method has been known as a method for detecting a motion vector in such a image coding device. In the block matching method, a picture is divided into a small rectangular regions (blocks), and motion is detected block by block. The block size is a size of horizontal 8 pixels×vertical 8 pixels (abbreviated as 8×8 hereinafter) or a size of 16×16. Next, the block matching method is described with reference to FIG. 2.

In FIG. 2, a reference block RB of M×N is set in the reference frame 41. A search block SB having the same size as the reference block RB is set in a search frame 42. The search block SB is moved in a prescribed search range 43 of a size ±m×±n around the SB0 located at the same position as that of the reference block RB in the search frame 42. The match between the reference block RB and search block SB is calculated, the search block having the highest match is assigned as a matching block, and the motion vector is calculated from the matching block.

In detail, in the case that the match of a search block SBk located at the position shifted (u, v) from a search block SBo located at the same position as the reference block RB is highest, the motion vector of the reference RB is referred to (u, v). When, the search block which leads to the minimum of the total of the absolute value difference of respective pixels at the same position of the reference block RB and search block SB or the total of the difference square of respective pixels is assigned as the search block of the highest match.

In MPEG system, one sequence of a dynamic image is divided into GOP (Group of Picture) composed of a plurality of frames (picture) for coding. A GOP is composed of an in-frame coding image (I picture), inter-frame coding image (P picture) predicted from the precedent frame already coded, and inter-frame coding image (B picture) predicted from two precedent and subsequent frames already coded.

For example, in FIG. 3, first the I0, which is an I picture, is in-frame coded, and then the motion is detected using a P picture of the P3 as a reference frame and the I0 as a search frame. Next, the motion is detected in both direction using B picture of B1 as a reference frame and I0 and P3 as search frames. Next, the motion is detected in both direction using B picture of B2 as a reference frame and I0 and P3 as search frames.

As shown in FIG. 4, generally the search range required for motion detection is desirably increased in proportion to the frame interval between a reference frame and search frame. Herein, an example involving a reference frame containing a reference block having the block size of 16×16 is described. For example, in the case that the search range ranges ±16 in horizontal and vertical directions for a frame interval of 1 frame, the search range desirably ranges ±32 for a frame interval of 2 frames and ±48 for a frame interval of 3 frames.

However, if the search range is widened in proportion to the frame interval, the quantity of hardware required for motion detection increases to 4 times and 9 times that for the frame interval of 1 frame. In other words, a lot of hardware is required to perform motion detection for the frame interval of 3 frames as in the case of motion detection using P3 as a reference frame and I0 as a search frame.

The telescopic search has been known as a method for enlarging the search range without increment of hardware. The telescopic search can cover the wide search range by providing offset at the center of the search range for respective reference blocks maintaining the research range always within ±16. The telescopic research is described with reference to FIG. 5 herein under.

As shown in FIG. 5, for example, in the case that search is performed on the search frame positioned 3 frame apart from the reference frame, at first, a motion vector MV1 at the reference block with the search range of ±16 on the search frame 1 positioned 1 frame apart is obtained. Next, search is performed within the search range of ±16 with the center on the search range of MV1 on the search frame 2 positioned 2 frames apart in order to obtain a motion vector MV2. When, the search range of the view from the reference block in the reference frame is ±32. Finally, on the search frame 3 positioned 3 frames apart, search is performed within the search range of ±16 with the center on the search range of MV2 in order to obtain a motion vector MV3. As described herein above, finally the motion vector positioned 3 frames apart is obtained for the search range of ±48. If pipe line processing is performed, hardware quantity of only 3 times that for covering the search range of ±16 is required.

Comparison of transfer rate of search data between the fixed search range and telescopic search is shown in FIG. 6.

In the case of the fixed search range, reference blocks adjacent in the horizontal direction, for example, RB0 and RB1 overlap on 32×48 as shown in FIG. 6A, and only data of 16×48 where the search ranges do not overlap may be transferred additionally.

On the other hand, in the case of the telescopic search, because the search range is different for respective reference blocks, it is required to transfer a search range of ±16 (48×48) at a 256 (=16×16) clock every time as shown in FIG. 6B.

Therefore, to perform the telescopic search in the search range of ±16, the transfer rate 3 times, namely (48×48)/(16× 48), is required. This value further increases with increasing search range, for example, in the case of ±32, the transfer rate five times, namely (80×80)/(80×16), is required for the telescopic search, the increment causes a difficulty. Assuming a pixel data of 8 bits and pixel clock of 13.5 MHz, then the transfer rate of (80×80/256)×13.5 MHz×1 byte =337.5 MB/sec is required. Such a large transfer rate is a high barrier to realize the hardware.

In this example, only ±48 namely 3 times the usual basic search range (±16) can be covered. However actually, in the case of a quickly moving picture in a program such as sports program, such a search range (±48) can not cover the motion to cause deterioration of picture quality.

As described herein above, the conventional telescopic search is disadvantageous in that a very large data transfer rate is required to transfer search block. Additionally, the telescopic search is disadvantageous in that the enlarged basic search range is required in order to cover very quick motion and in that the larger data transfer rate is required for such case.

SUMMARY OF THE INVENTION

In view of problems described above, it is the object of the present invention to provide a device and method for image coding which are capable of enlarging the search range without increment of transfer rate of the search block.

The image coding device in accordance with the present L invention is provided with a reference frame memory for storing image data of a reference frame, a search frame memory for storing image data of a search frame, a motion detection means for reading image data from the reference frame and the search frame and detecting a motion vector by calculating the image data, and a judgement means for generating a motion vector distribution from the motion vector detected by the motion detection means in a search range of the search frame M fields or M frames (M is an integer one or larger) apart from the reference frame, and for deciding a search position between images N fields or N frames (N is an integer larger than M) apart, and the motion detection means perform motion detection at the search position decided by the judgement means.

The image coding method in accordance with the present invention comprises a step for storing image data of a reference frame in a reference frame memory, a step for storing image data of a search frame in a search frame memory, a step for reading image data on a search range of a search frame M fields or M frames (M is an integer of one or larger) apart from the reference frame read out from the reference frame memory, calculating it to detect a motion vector, and generating a motion vector distribution, a judgement step for deciding a search position between images N fields or N frames apart (N is an integer larger than M) based on the motion vector distribution, and a motion In detection step for detecting a motion at the search position decided in the judgement step.

According to the image coding device in accordance with the present invention, the detection means detects a motion vector between images M fields or M frames (M is an integer of 1 or larger) apart. The judgement means generates a motion vector distribution for the whole image or every partial regions using the motion vector, and decides the search position between images N fields or N frames (N is an integer larger than M) apart using the distribution. The motion detection means performs the motion detection using the block of the decided search position.

According to the image coding device in accordance with the present invention, the offset is provided to the center of the search range when the motion vector is detected.

BRIEF DESCRIPTION OF THE DRAWINGS

FIG. 3 is a diagram for describing an example of motion detection in MPEG.

FIGS. 4A to 4C are diagrams for describing the relation between the frame interval and desired search range.

FIG. 7 is a block diagram for illustrating the first embodiment of a motion vector detection circuit in accordance with the present invention.

FIG. 8 is a block diagram for illustrating the second embodiment of a motion vector detection circuit in accordance with the present invention.

FIG. 10 is a flow chart for describing motion detection processing in the motion vector detection circuit shown in FIG. 8.

DETAILED DESCRIPTION OF THE PREFERRED EMBODIMENTS

Figure 1:
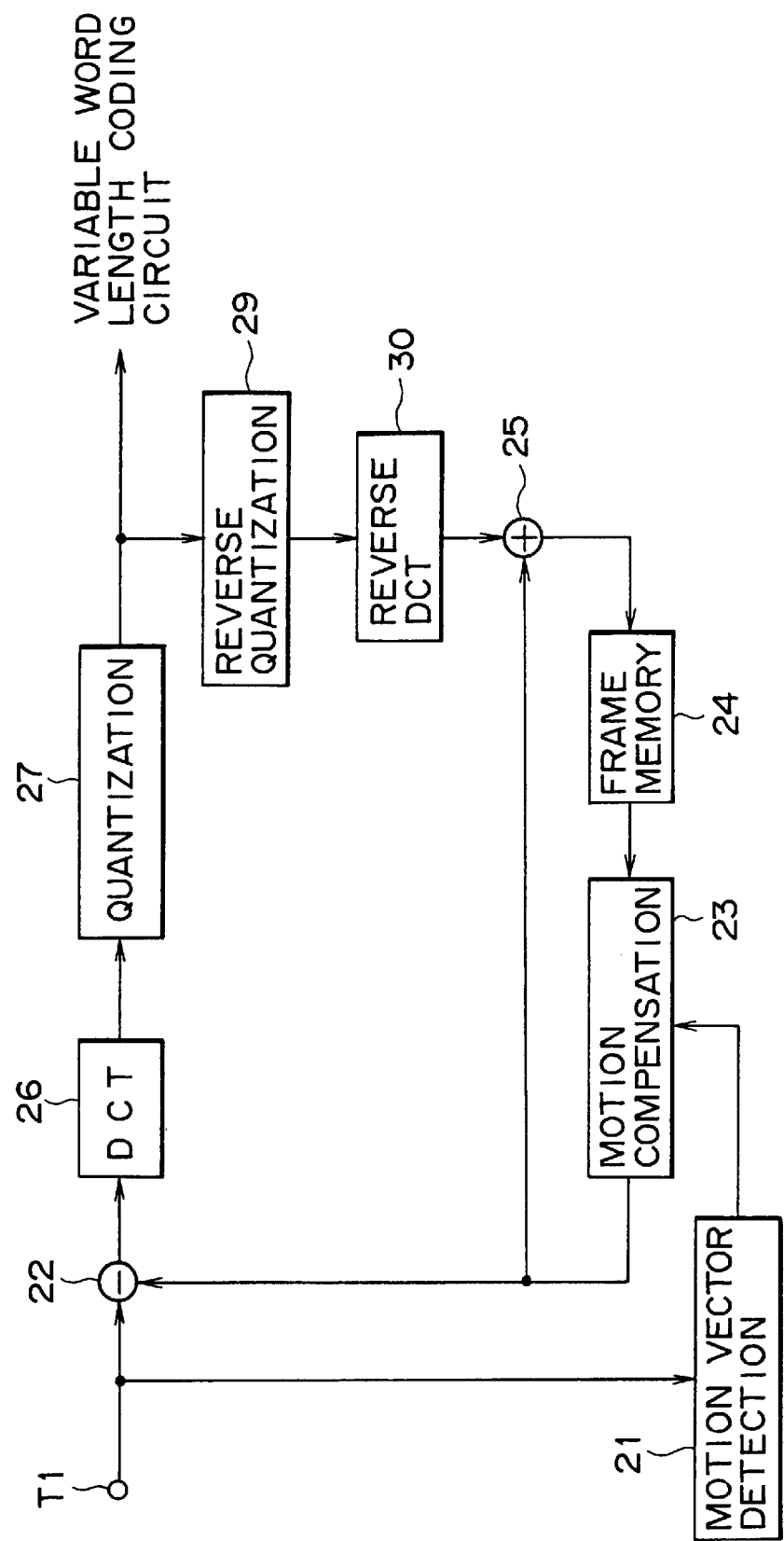
FIG. 1 is a block diagram for illustrating the structure of an image coding device based on MPEG system.
Figure 2:
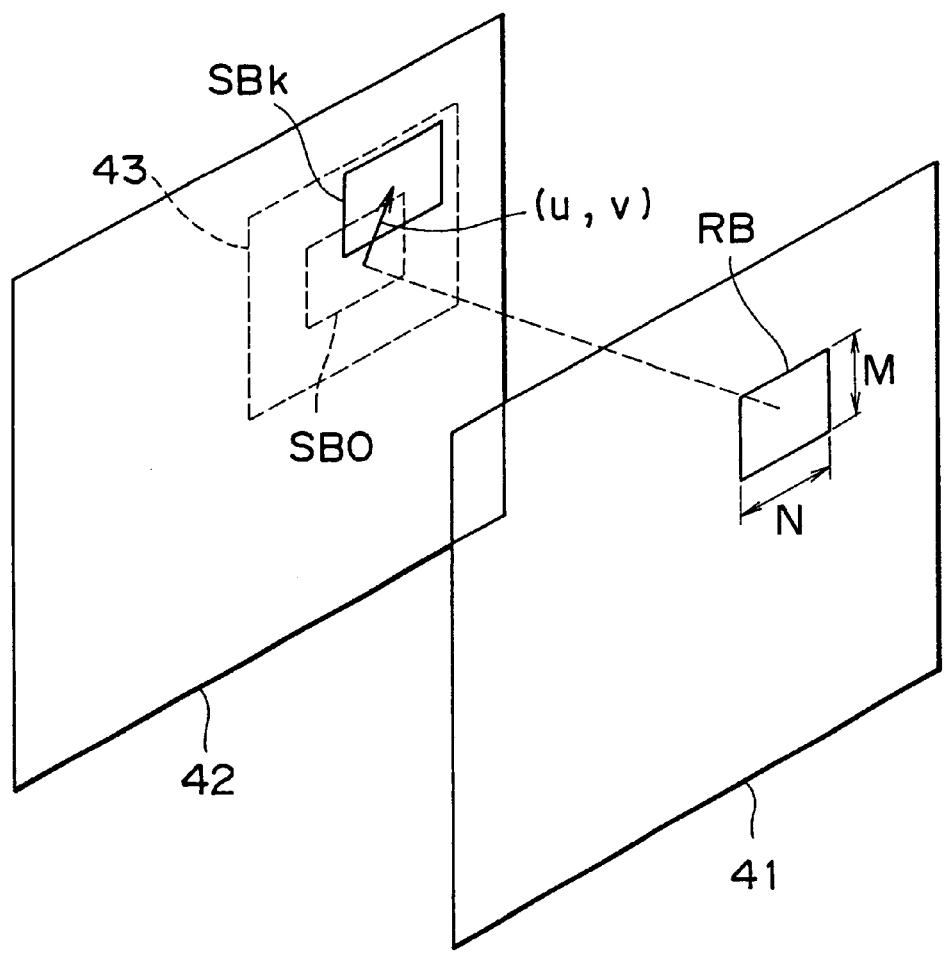
FIG. 2 is a diagram for describing the block matching method.

Preferred embodiments of the present invention will be described in detail hereinafter with reference to the drawings.

FIG. 7 is a block diagram for illustrating the first embodiment of a motion vector detection circuit to which the present invention is applied. The motion vector detection circuit comprises a reference frame memory 1, search frame memory 2, motion detection circuit 3, and motion vector distribution detection circuit 4.

The reference frame memory 1 stores an image of a reference frame. The search frame memory 2 stores an image of a search frame, and set a search range of a search block according to a search block read control signal c transmitted from the motion vector distribution detection circuit 4.

The motion detection circuit 3 calculates a motion vector d of the reference block from a image data a of the reference block transferred from the reference frame memory 1 and a image data b of an search block transferred from the search frame memory 2. The motion vector d is, for example, calculated by way of the block matching method described as the conventional example. The motion detection circuit 3 outputs the calculated motion vector d together with the current residual difference e.

The motion vector distribution detection circuit 4 generates a search block read control signal c based on the motion vector d transmitted from the motion detection circuit 3 and the residual vector d, and supplies it to the search frame memory 2. In detail, a reference vector corresponding to the center of a search range used for performing motion detection between images 2 frames/or 2 fields or more apart each other based on the motion vector distribution between images 1 frame/or 1 field apart each other is calculated. Depending on the reference vector corresponding to the center of the search range, the motion vector distribution detection circuit 4 outputs the search block read control signal c, and controls reading from the search frame memory 2 of the search block based on the search block read control signal c.

FIG. 8 is a block diagram for illustrating the second embodiment of a motion vector detection circuit to which the present invention is applied. Corresponding components in FIG. 7 are given the same number.

The motion vector detection circuit is provided with the first motion detection circuit 3-A and second motion detection circuit 3-B. The motion vector detection circuit is also provided with a motion vector distribution detection circuit 4' for detecting a motion vector distribution in a picture from a motion vector d1 and residual difference e1 outputted from the first motion detection circuit 3-A or a motion vector d2 and residual difference e2 outputted from the second motion detection circuit 3-B, and for generating a detection block read control signal c. Further, a comparison circuit 5 for calculating a final motion vector f from the motion vector d1 and residual difference e1 outputted from the first motion detection circuit 3-A, and the motion vector d2 and residual difference e2 outputted from the second motion detection circuit 3-B is provided.

The first motion detection circuit 3-A and second motion detection circuit 3-B perform motion detection in search ranges different each other. The search range of the respective motion detection circuits is ±16 both in horizontal and vertical directions.

Figure 9A:
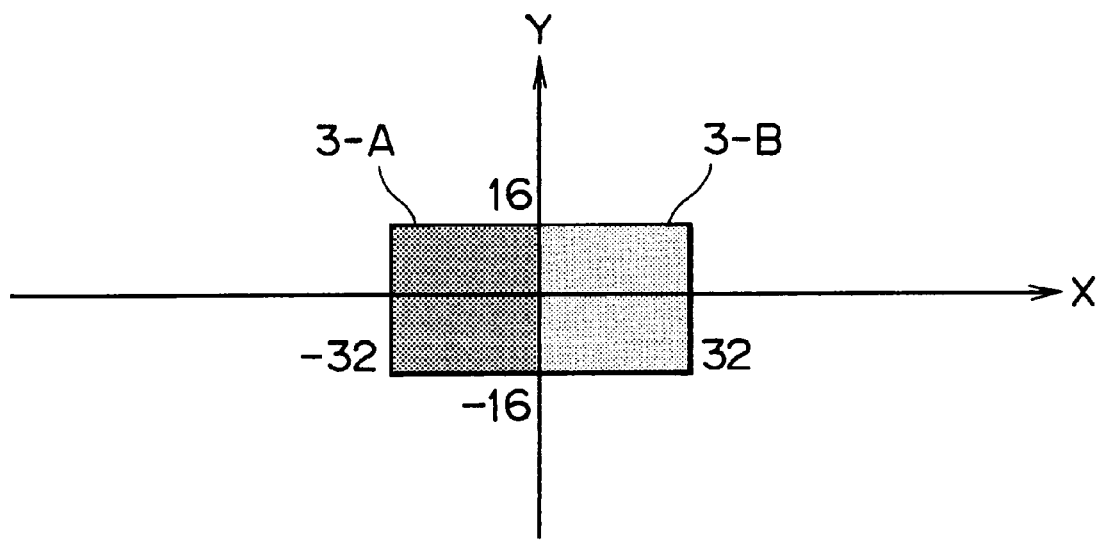
FIGS. 9A and 9B are diagrams for showing the search range for fixed search range of the two motion detection circuits and the search range for detection of a motion vector.

In the case of a fixed search range, because image moves fast often in the horizontal direction generally, the search range is set so that the horizontal search range is larger than the vertical search range as shown in FIG. 9A. In the drawing, the range indicated as 3-A in the left side of Y-axis is the search range of the first motion detection circuit 3-A, and the range indicated as 3-B in the right side of Y-axis is the search range of the second motion detection circuit 3-B. In this case, the total search range of the first motion detection circuit 3-A and second motion detection circuit 3-B ranges ±32 in the horizontal direction and ±16 in the vertical direction, and the reference vector corresponding to the search range center is (X, Y)=(0, 0).

On the other hand, in the present invention, it is possible that the search range of the first motion detection circuit 3-A is fixed, and on the other hand, the search range of the second motion detection circuit 3-B is changed. Therefore the search range can be enlarged (details are described hereinafter).

Figure 13:
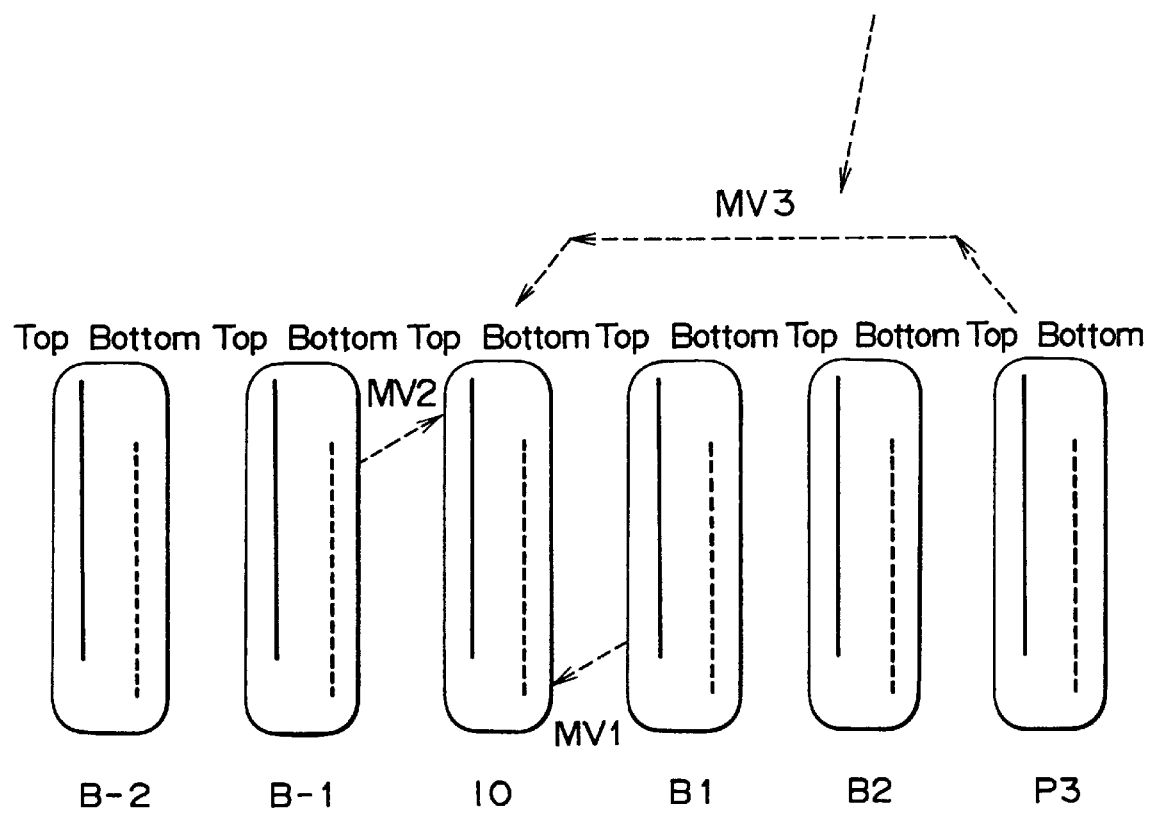
FIG. 13 is a diagram for describing detection of the motion vector 3 frame apart.

Next, motion detection processing in the motion vector detection circuit shown in FIG. 8 is described with reference to FIG. 10. Herein, a case that a search range on a search frame 3 frame apart is determined using a vector for motion detection between images 1 field apart will be described. Assuming that images are arranged as shown in FIG. 13, the search range is for detecting the motion vector of the P3 using the I0 of the search frame 3 frames apart is decided.

At first, motion from the top field (top field is abbreviated as Top hereinafter) of B1 1 field apart to the bottom field (bottom field is abbreviated as Bottom hereinafter) of I0 is detected using anyone of the first motion detection circuit 3-A and second motion detection circuit 3-B, and the resultant residual difference and motion vector are stored in the motion vector distribution detection circuit 4'. The search range ranges ±16 in the horizontal direction and ±16 in the vertical direction, the reference vector corresponding to the search range is (X, Y)=(0, 0). This processing is shown in the step S1 in FIG. 10.

Figure 9B:
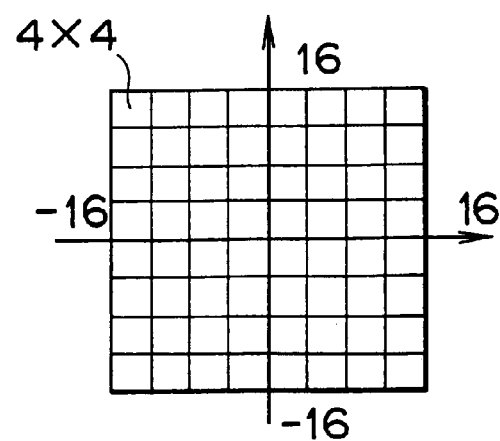

In the step S1, "vector distributions corresponding to motion detection between 1 field are generated for all the fields" is executed. In detail, for example, as shown in FIG. 9B, the search range of the motion vector of ±16 (32×32) is divided into 4×4 size blocks, and the number of motion vector in the search range is counted. When, a motion vector having a residual difference smaller than a pre-determined threshold value is not counted because of poor reliability.

Figure 11A:
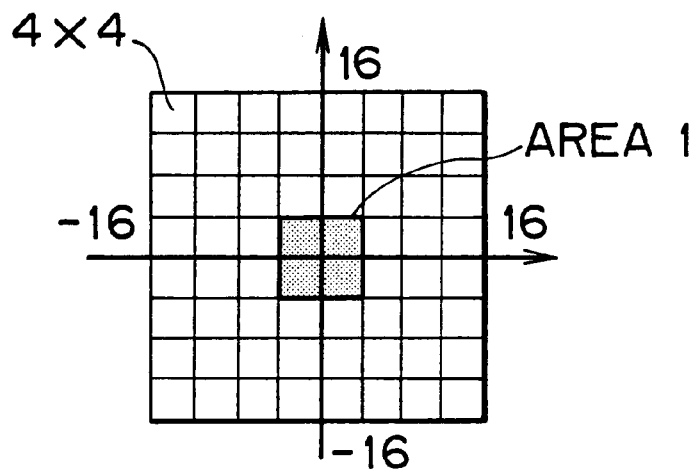
FIGS. 11A and 11B are diagrams for describing an example of a motion vector distribution in static mode and dynamic mode in the motion vector detection circuit shown in FIG. 8.

In the step S2, whether the picture is static is judged. In detail, if the number of motion vectors in the area (area 1) ±4 in the horizontal direction and ±4 in the vertical direction on the central portion of the search range is equal to or larger than a certain threshold value Th1, the picture is judged to be in static mode (normal mode), and set as static mode in the step S3. The function Count (specified area) is a function to return the total of the number of vectors included in the specified area. The area 1 is the shaded portion in FIG. 11A, and corresponds to the static area. In other word, the case that the majority of the motion vector is static, the picture is judged to be in static mode.

If the picture is judged to be not in static mode in the step S2, then centroid MVC (mvx-c, mvy-c) where motion vectors are concentrated most intensively is determined in the step S4. The total number of vectors is counted around the centroid, and if the value is equal to or larger than a threshold value Th2, then the picture is judged to be in dynamic mode (shift mode), and set as dynamic mode in the step S5.

Herein, to find the centroid MVC, for example, the number of vectors in respective sub-blocks of 4×4 size is counted over the entire search range, and then the number of vectors in a window comprising 2 horizontal sub-blocks and 2 vertical sub-blocks are searched on the entire search range to find a window where vectors are concentrated most intensively, and the centroid is found dependently on the number of vectors in four sub-blocks in the window. The number of motion vectors in the area 2 is counted around the centroid, and whether the value is higher than the threshold value TH2 is judged. The area ranges 8 to 16 in the horizontal direction and −4 to +4 in the vertical direction in FIG. 11B, however the area 2 is changed depending on the position of the centroid.

In the step S4, if the total number of motion vectors in the area 2 is smaller than the threshold value Th2, then the picture is set as static mode in the step S6.

Figure 11B:
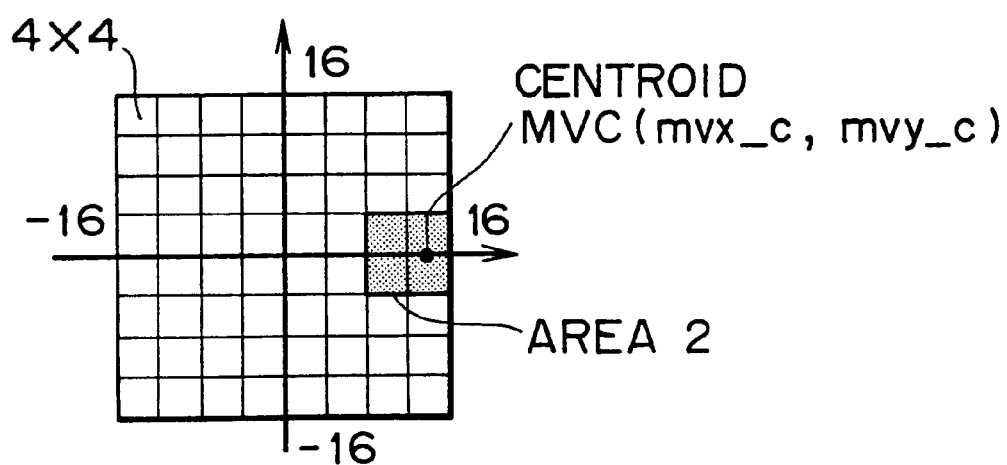

For example, in the case that a camera tracks a player or a ball which moves fast by way of high speed pan, for example, in a sports program, the background which occupies a large area and is the majority of the picture moves fast in a certain direction, such motion causes the vector concentration as shown in FIG. 11B. On the other hand, the player or ball which the camera tracks is static, therefore the residual vectors are distributed in the static area (area 1).

In the next step S7, depending on the mode set in the step S3, S5, or S6, the center vector SMV1 of the search range of the first motion detection circuit 3-A and second motion detection circuit 3-B is determined.

Figure 12A:
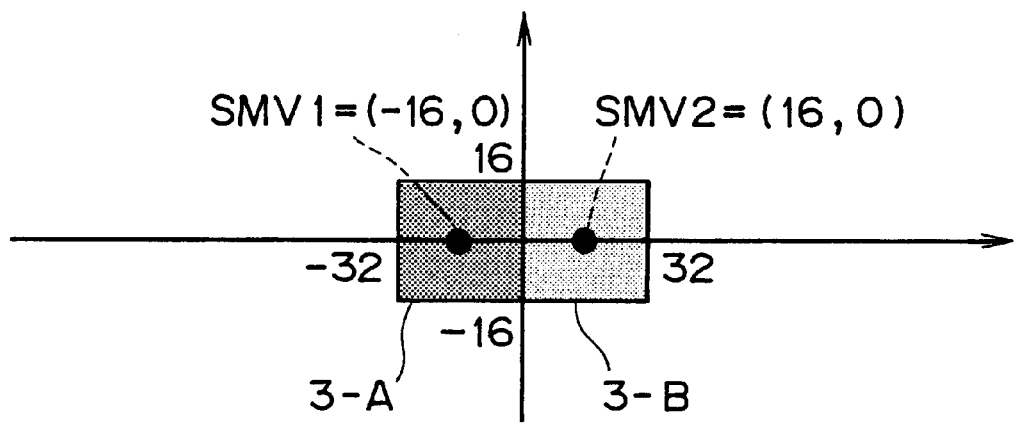
FIGS. 12A and 12B are diagrams for describing an example of a search range in static mode and in dynamic mode in the motion vector detection circuit shown in FIG. 8.

FIG. 12A shows the search range of static mode. This search range is the same as the fixed search range shown in FIG. 9A. The center vector of the search range is SMV1= (mvx1, mvy1)=(−16, 0), and SMV2=(mvx2, mvy2)=(16, 0) respectively.

Figure 12B:
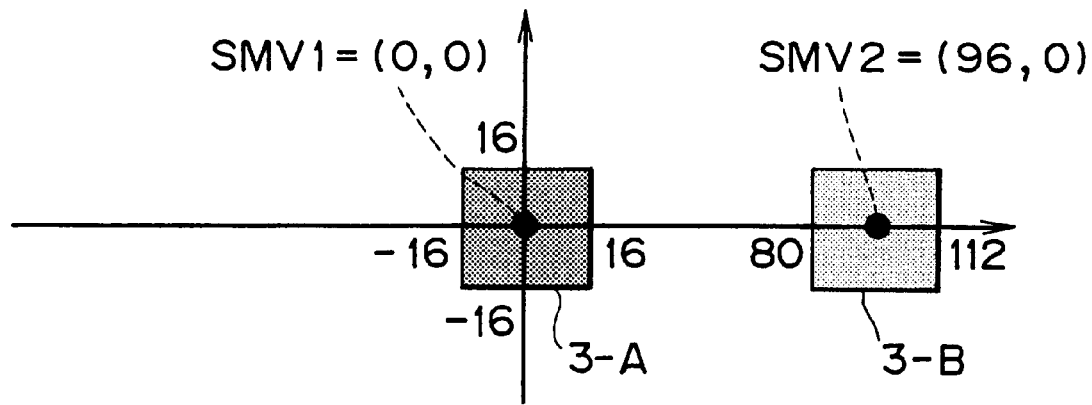

On the other hand, in the case of dynamic mode, the search range is set as shown in FIG. 12B. In this case, the center vector of the search range is SMV1=(mvx1, mvy1)= (0, 0), and SMV2=(mvx2, mvy2)=(96, 0). Next, the reason for setting the center vector of the search range in dynamic mode to this value is described.

As shown in FIG. 13, detection MV3 of the motion vector apart 3 frames include 4 types namely from Top of P3 to Top of I0, from Top of P3 to Bottom of I0, from Bottom of P3 to Top of I0, and from Bottom of P3 to Bottom of I0 as a field vector, the respective vectors correspond the field distance of 6 fields, 5 fields, 7 fields, and 6 fields. The distance of the frame vector MV3 is 6 fields. In view of these distances, the distance from P3 to I0 is regarded as 6 fields in average, therefore, two areas around SMV2=(6mvx_c, 6mvy_c) 6 times motion centroid MVC (mvx_c, mvy_,c) between 1 field are searched. Thereby, the motion of the background fast moving area and the static player or ball area is both covered in the search range.

Herein, the case of horizontal motion pan is exemplified, however vertical motion tilt and slant motion are also processed in the same way. According to this system, in this embodiment, the maximum search range is enlarged horizontally and vertically to ±16×(6+1)=±112. Because two motion detection circuit are used, the transfer rate of search data per 1 block is 48×16×2, the search range is wider in comparison with the telescopic search in spite of reduced search data transfer rate.

Figure 14:
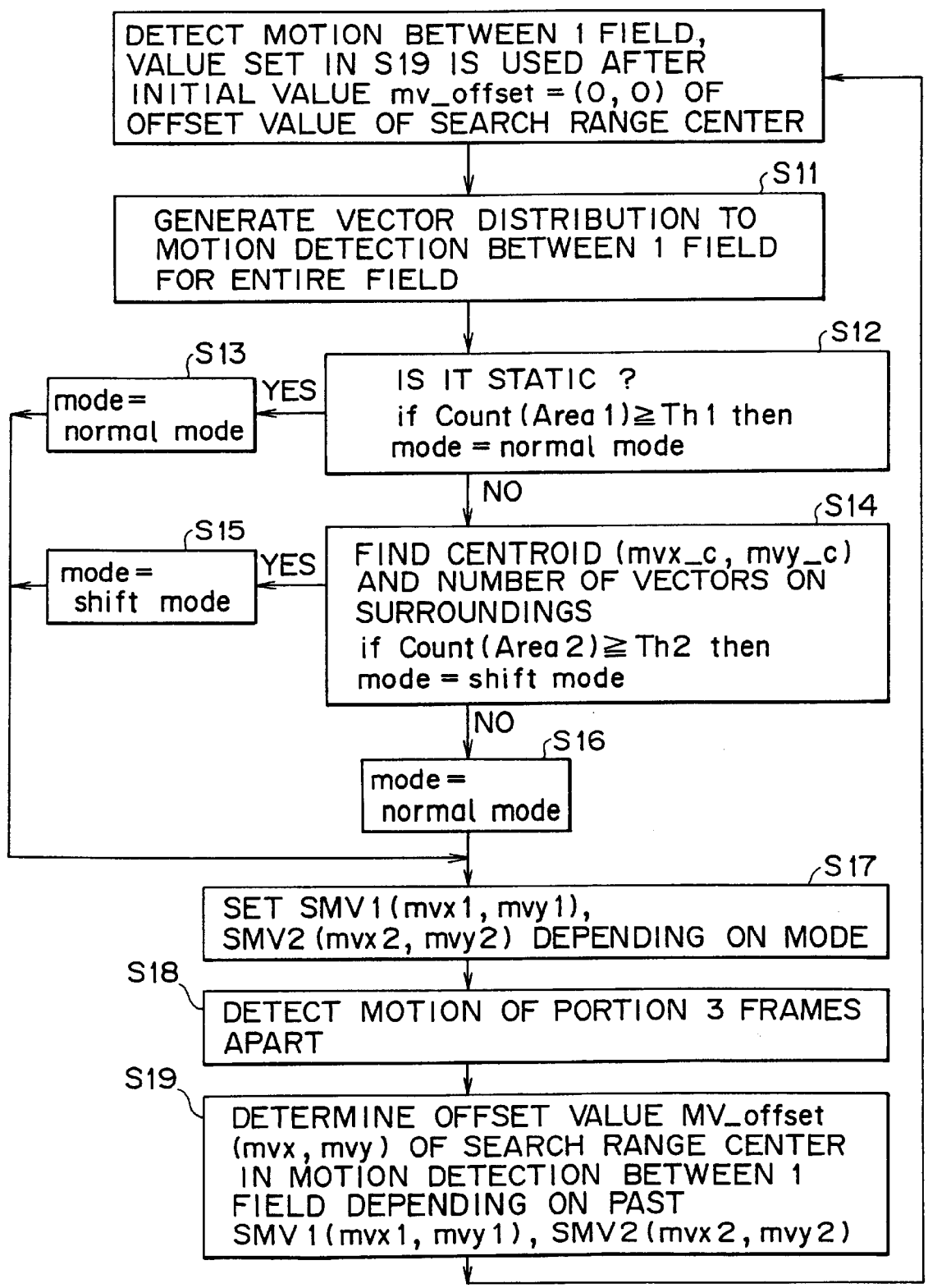
FIG. 14 is a flow chart for describing another example of motion detection processing in the motion vector detection circuit shown in FIG. 8.

FIG. 14 shows another example of motion detection processing in the motion vector detection circuit shown in FIG. 8. In this processing, the offset value MV-offset (mvx, mvy) of the search range center is set as (0, 0) first when motion is detected between 1 field, and thereafter changed depending on the distribution of the reference vector.

As shown in FIG. 14, at first the center value of the search range MV_offset is set at (0, 0) . The steps S11 to S18 are the same as the steps S1 to S8. In the step S19, the offset value of the search range center MV—offset (mvx, mvy) in motion detection between 1 field is determined depending on the past SMV1 (mvx1, mvv1), and SMv2 (mvx2, mvv2).

Figure 15A:
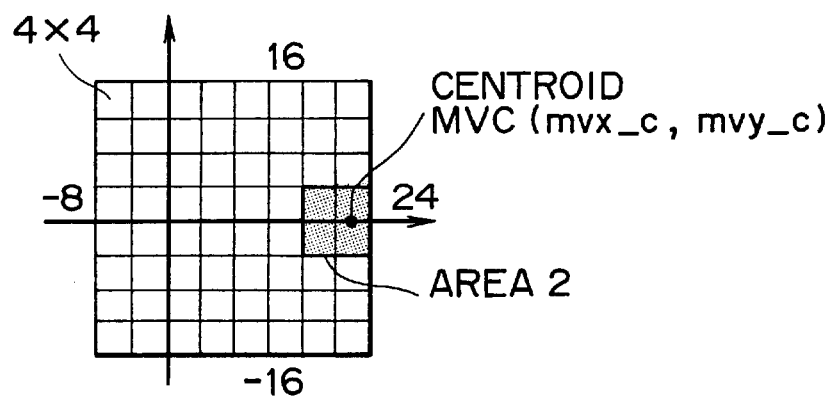
FIGS. 15A and 15B are diagrams for describing an example of the motion vector distribution and search range in the processing shown in FIG. 14.

For example, in the case that the motion vector counted in the step S14 has a distribution as shown in FIG. 11B, it is estimated that motion will be in the right direction, the search range center is changed to (8, 0) as shown in FIG. 15A. As the result, the search range ranges from −8 to +24 in the horizontal direction, and ranges from −16 to +16 in the vertical direction, thus the search range is extended right side in the horizontal direction.

As described herein above, in the case that the camera pan is accelerated in the right direction, the vector distribution as shown in FIG. 15A is obtained by extending the search range to the right side in the horizontal direction. Such a vector distribution can not be obtained if the search range center is positioned at (0, 0).

Figure 15B:
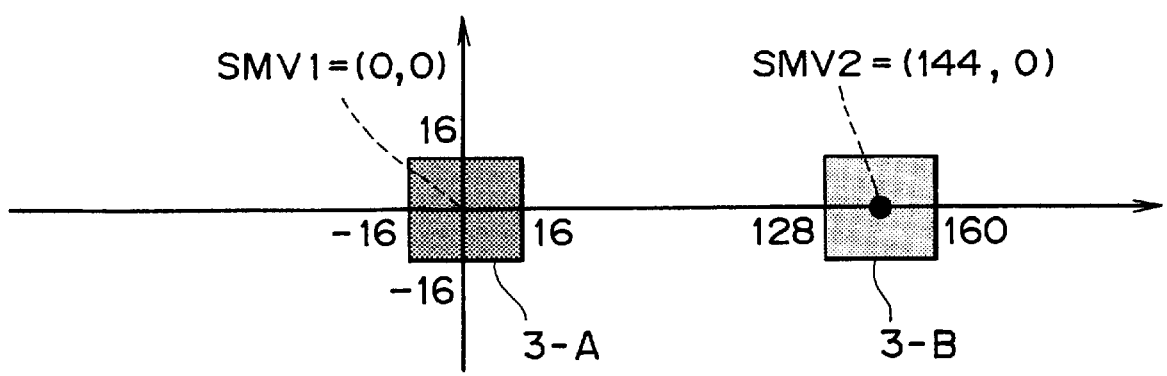

In the case that motion between 3 frames is detected with extending the search range center to the right side horizontally, the search center SMV2 (mvx2, mvy2) of the second motion detection circuit 3-B is set at (24×6, 0). This search center is shown in FIG. 15B. Thereby, the maximum search range is enlarged to ±(24×6+16)=+160 both in horizontal and vertical directions. This processing is particularly effective for a picture when the whole picture is accelerated.

In this embodiment, the embodiment in which the motion vector MV3 between 3 frames is determined from the vector distribution MV1 between 1 field has been described, however the motion vector between N (field/frame) can be determined from the motion vector distribution between M (field/frame) (N>M ≧1) by applying the present invention.

In this embodiment, the example in which the distribution of the motion vector MV1 from the future Top (B1) to the current Bottom (I0) is used has been described, however the distribution of the motion vector MV2 (between 1 field) from the past Bottom (B1) to the current Top (I0) may be used. Alternatively both distribution of MV1 and MV2 may be used for judgement.

In this embodiment, the example in which two motion detection circuits are used is described, however the number of motion detection circuits is by no means limited to two, and may be one as shown in FIG. 7 or may be three or more.

In this embodiment, the motion vector distribution is detected over the entire field or frame, however alternatively a picture is divided into a plurality of areas, and motion vector distribution is determined for respective areas (for example, one area may be ½, or ¼ picture, divided into a plurality of macro-blocks), the search range is set individually.

Figure 16A:
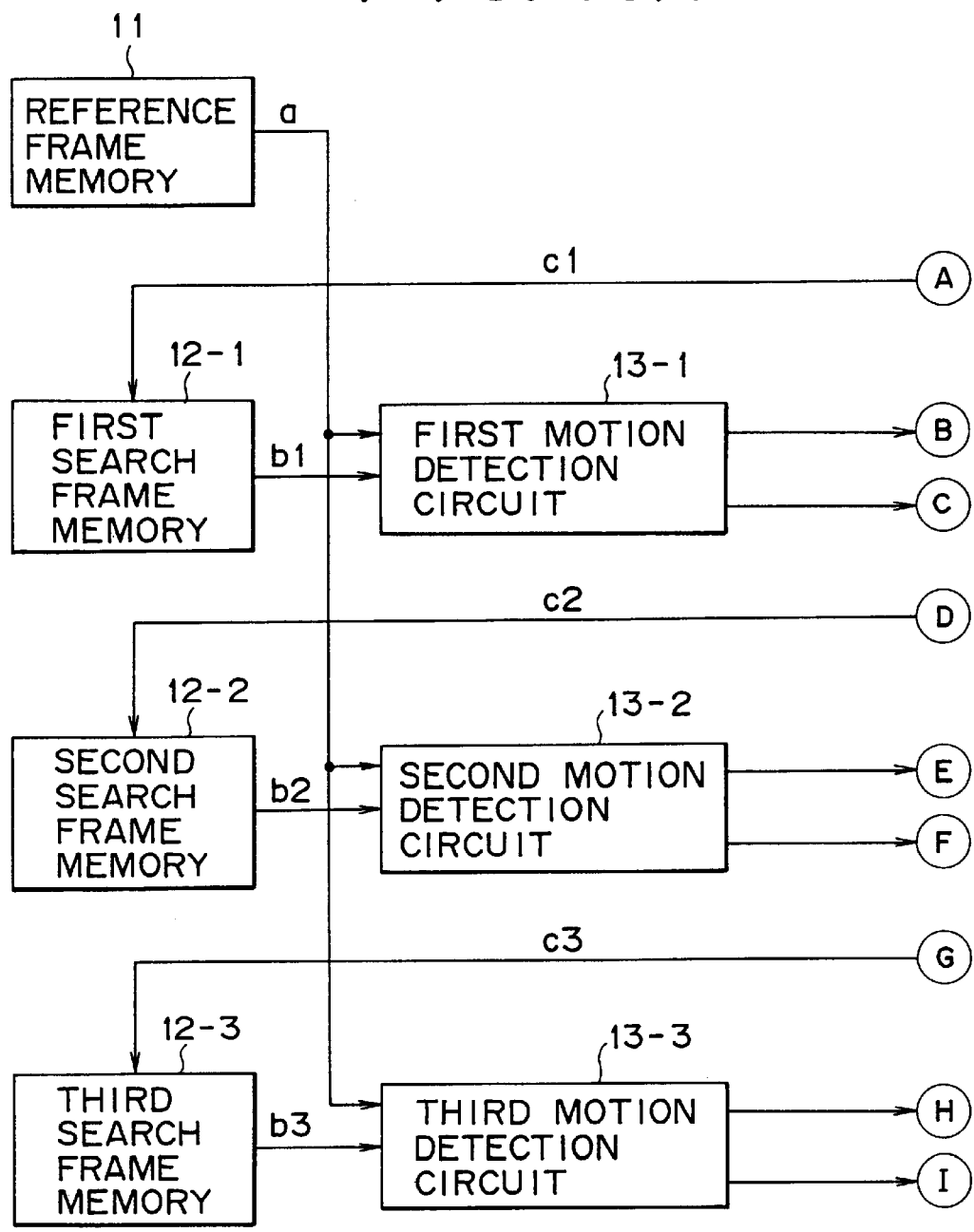
FIG. 16 is a block diagram for illustrating the structure of a motion vector detection circuit in the case that the present invention is applied to the telescopic search.

FIG. 16 shows the structure of a motion vector detection circuit in the case that the present invention is applied to the telescopic search. The motion vector detection circuit comprises a reference frame memory 11, the first to third search frame memories 12-1 to 12-3, the first to third motion detection circuits 13-1 to 13-3, the first to third motion vector distribution judgement circuits 14-1 to 14-3, and a vector addition circuit 15.

The reference frame memory 11 stores a picture of the reference frame. The first to third search frame memories 12-1 to 12-3 store a picture of the search frames 1 to 3, and set the search range of an search block according to the first to third search block read control signals c1 to c3 transmitted from the first to third motion vector distribution judgement circuits 14-1 to 14-3.

The first to third motion detection circuits 13-1 to 13-3 determines motion vectors d1 to d3 of the reference block based on the image data a of the reference block transmitted from the reference frame memory 11 and the image data b1 to b3 of the search block transmitted from the first to third search frame memories 12-1 to 12-3. The motion vectors d1 to d3 are determined by way of the block matching method. The first to third motion detection circuits 13-1 to 13-3 output the determined motion vectors d1 to d3 together with the current residual differences e1 to e3.

The first motion vector distribution judgement circuit 14-1 determines the center of this search range based on the first to third motion vectors g (MV1 to MV3) of the reference block, and transmits the first search block read control signal c1 to the first search frame memory 12-1.

The second motion vector distribution judgement circuit 14-2 determines the center of this search range based on the motion vector d1 and residual difference c1 transmitted from the first motion detection circuit 13-1, generates the second search block read control signal c2, and transmits it to the second search frame memory 12-2.

Similarly, the third motion vector distribution judgement circuit 14-3 determines the center of this search range based on the motion vector d2 and residual difference e2 transmitted from the second motion detection circuit 13-2, generates the third search block read control signal c3, and transmits it to the third search frame memory 12-3.

The vector addition circuit 15 adds the outputs from the first to third motion detection circuits 13-1 to 13-3 to figure out the final motion vector f.

Figure 17:
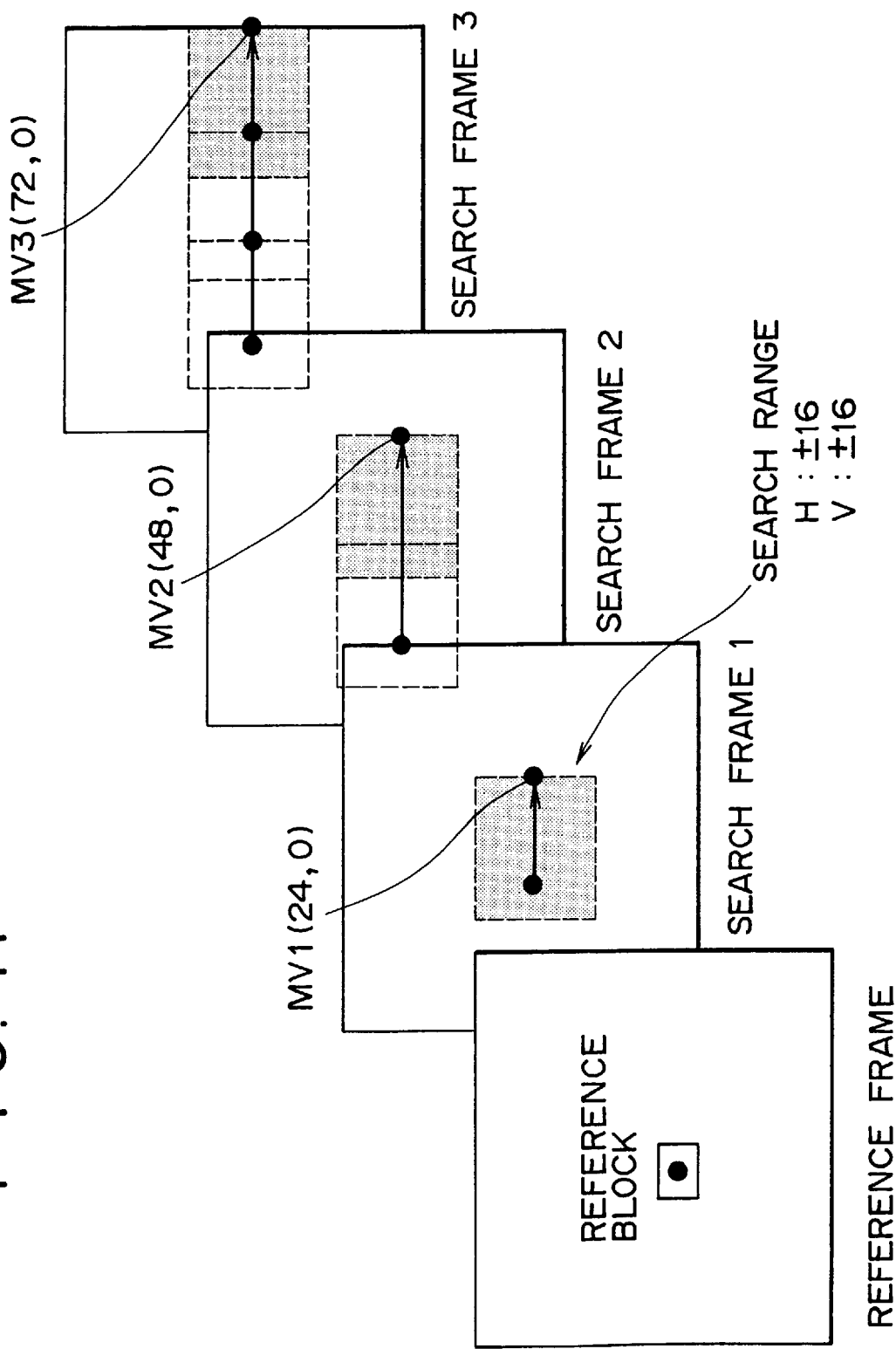
FIG. 17 is a diagram for describing an example of the search range in the case that the present invention is applied to the telescopic search.

FIG. 17 shows an example of a search range of the motion vector detection circuit shown in FIG. 16. In the conventional telescopic search, always for searching of the first step namely search frame 1, searching is performed in a range of ±16 in the horizontal and vertical directions in the search range having the center at (0, 0), and the search in the next step is performed around the vector selected in this step. On the other hand, in the present invention, in the case that the precedent macro-block moves fast in the current step, the center of the search range of the current macro-block in the current step is changed dependently on the motion. In the case that motion in the precedent step is fast, the center of the search range in the current step is changed dependently on the motion. Thereby, the search range can be enlarged without increment of scale of circuit and transfer rate of the search data.

For example, ±8 change of the search range center (0, 0) results in the maximum search range of ±(16+8)×3=±72. As shown in FIG. 17, in the case of fast motion to the right side in the horizontal direction (motion of 24 pixels between 1 frame), conventionally the search range center set at (0, 0) in the first step (search frame 1) is shifted to the right horizontally, and set at (8, 0).

MV1 (24, 0) is selected as a motion vector in the first step, and (32, 0) that (24, 0) is shifted to the right horizontally by 8 is set to the search range center in the second step (search frame 2). MV2 (48, 0) is selected as the motion vector in the step 2, and (56, 0) that (48, 0) is shifted to the right horizontally by 8 is set at the search range center. Finally the motion vector MV3 (72, 0) is obtained.

Figure 5:
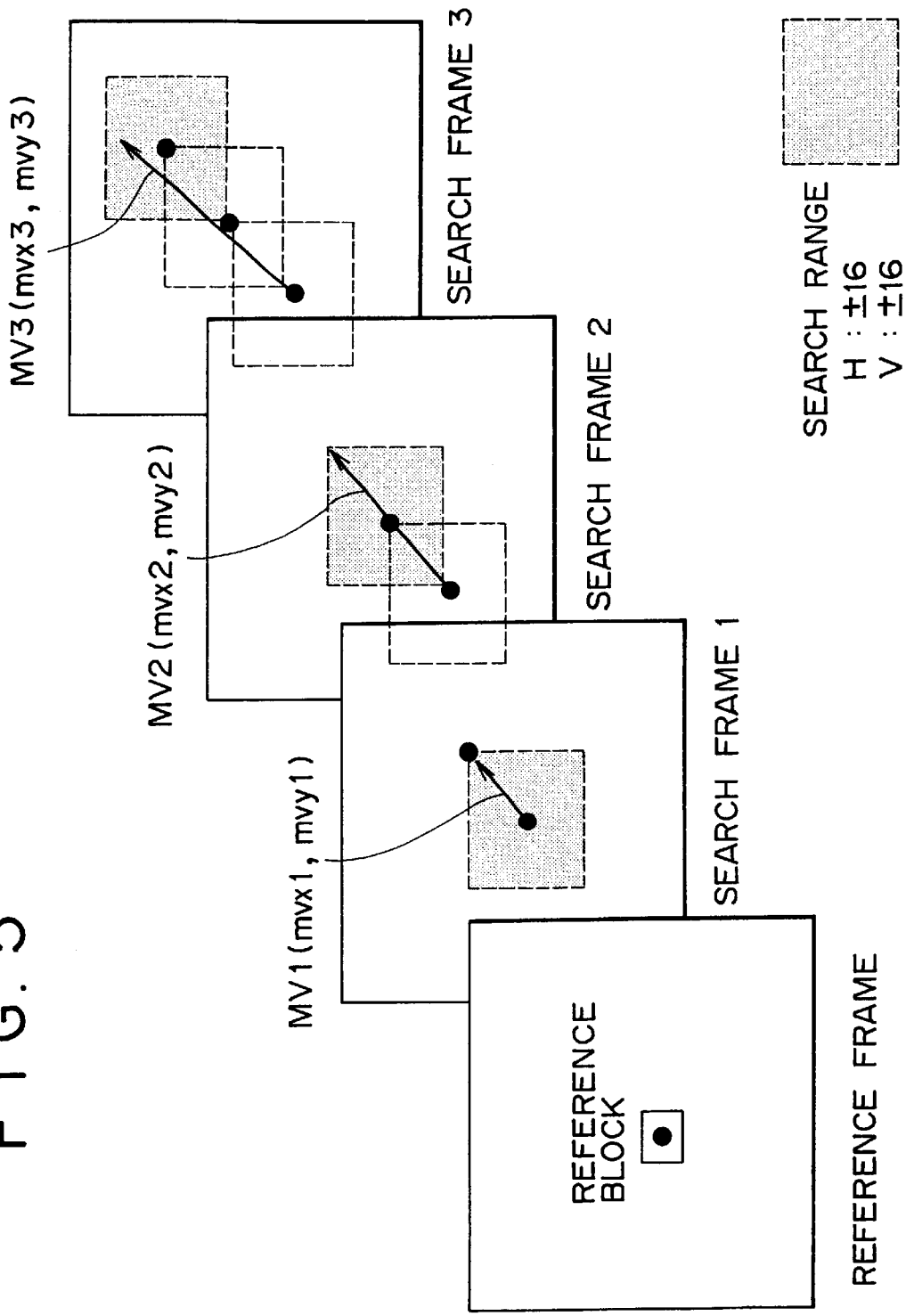
FIG. 5 is a diagram for describing the conventional telescopic search.
Figure 6A:
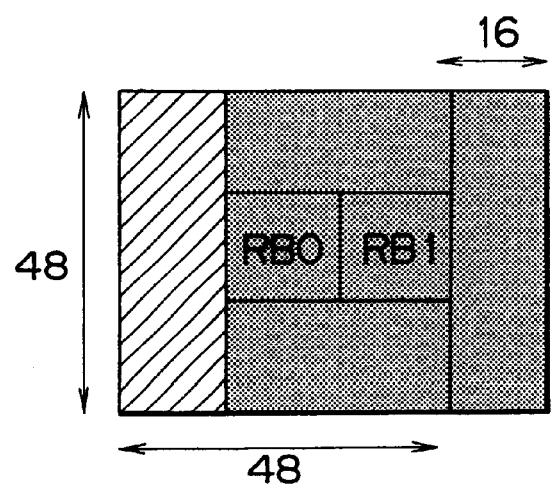
FIGS. 6A and 6B are diagrams for describing the comparison of the data transfer rate between usual search and the telescopic search.
Figure 6B:
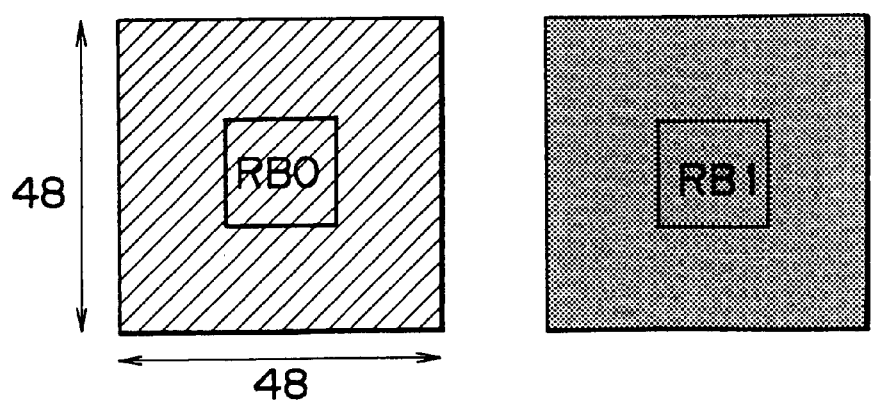

In other word, in the conventional telescopic search shown in FIG. 5, only the search range of ±48 is covered, on the other hand, in the present invention, the search range of ±72 is covered as shown in FIG. 17, the search range is enlarged 50%.

As described in detail hereinbefore, according to the present invention, the motion vector range can be enlarged without increment of transfer rate of search block. A very fast moving picture can be searched. In particular, because a search range is covered in the case of pan and tilt namely the case that the whole picture moves fast, or in the case that the motion is accelerated, thus the picture quality of coded image is improved in comparison with the conventional method.

Various modifications and applications are possible in light of the above teachings without departing from the spirit and scope of the present invention. Accordingly, the scope of the present invention is by no means limited to the specific embodiments.

What is claimed is:

1. An image coding device comprising:
   a reference frame memory for storing image data of a reference frame;
   a search frame memory for storing image data of a search frame;
   motion detection means for detecting a motion vector from a reference block and a search block which are formed by dividing said reference frame and said search frame into a plurality of regions;
   detecting means for generating a motion vector distribution from said motion vectors detected by said motion detection means between said reference frame and M fields or M frames (M is an integer one or larger) which is M frames apart from said reference frame, and for detecting at least the first and the second motion vector based on said motion vector distribution;
   calculating means for calculating a search position in a N-frame (N is an integer larger than M) which is apart N frames from said reference frame by multiplying said first and second motion vector and a constant in proportion to M and N; and
   said motion detection means detecting motion vector between said reference frame and calculated search position in the N-frame by searching only in the range of said search positions.

2. An image coding device as claimed in claim 1, wherein said motion detection means performs processing on every reference block and search block which are formed by dividing said reference frame and search frame into a plurality of regions.

3. An image coding device as claimed in claim 2, wherein the center of said search range where said search block searches served for generating said motion vector distribution is variable.

4. An image coding device as claimed in claim 3, wherein the center of said search range is decided based on the search position decided in the past.

5. An image coding device as claimed in claim 2, wherein the search position said N fields or N frames apart is in the range obtained by multiplying the motion vector detected by said motion detection means between said M fields or M frames by a constant in proportion to M and N.

6. An image coding device as claimed in claim 2, wherein said judgement means decides a plurality of different search positions based on said motion vector distribution, and said motion detection means is provided with a plurality of motion detection circuits for performing motion detection at said plurality of search positions.

7. An image coding device as claimed in claim 6, wherein said judgement means decides said plurality of search positions based on two regions of a moving region where motion vectors are concentrated and a static region where motion vectors are stragglingly distributed.

8. An image coding device as claimed in claim 2, wherein said motion detection means determines the motion vector by way of block matching method.

9. An image coding method comprising:

a step for storing image data of a reference frame in a reference frame memory;

a step for storing image data of a search frame in a search frame memory;

a step for detecting a motion vector by every a reference block and a search block which are formed by dividing on a search range of a search frame into a plurality of regions;

a detecting step for generating a motion vector distribution from said motion vector detected by said motion detection means between said reference frame and M fields or M frames (m is an integer one or larger) which is M frames apart from said reference frame and for detecting at least the first and the second motion vector based on said motion vector distribution;

a calculating step for calculating a search position in a N-frame (N is an integer larger than M) which is apart N frames from said reference frame by multiplying said first and second motion vector and a constant in proportion to M and N; and a motion detection step for detecting a motion vector between said reference frame and calculated at the search position in the N-frame by searching only in the range of said search positions.

10. An image coding method as claimed in claim 9, wherein in said motion detection step, the motion detection processing is performed on every reference block and search block which are formed by dividing said reference frame and search frame into a plurality of regions.

11. An image coding method as claimed in claim 10, wherein the center of said search range where said search block searches served for generating said motion vector distribution is variable.

12. An image coding method as claimed in claim 11, wherein the center of said search range is decided based on the search position decided in the past.

13. An image coding method as claimed in claim 10, wherein the search position said N fields or N frames apart is in the range obtained by multiplying the motion vector detected by said motion detection means between said M fields or M frames by a constant in proportion to M and N.

14. An image coding method as claimed in claim 10, wherein in said judgement step, a plurality of different search positions is decided based on said motion vector distribution, and said motion detection means is provided with a plurality of motion detection circuits for performing motion detection at said plurality of search positions.

15. An image coding method as claimed in claim 14, wherein in said judgement step, said plurality of search positions is decided based on two regions of a moving region where motion vectors are concentrated and a static region where motion vectors are stragglingly distributed.

16. An image coding method as claimed in claim 10, wherein in said motion detection step, the motion vector is determined by way of block matching method.

* * * * *